(12) United States Patent
Artman et al.

(10) Patent No.: US 10,248,602 B2
(45) Date of Patent: Apr. 2, 2019

(54) COMPUTING DEVICES HAVING SLOTS AND COMPONENTS FOR RECEIPT OF DIFFERENT TYPES OF PERIPHERALS

(71) Applicant: Lenovo Enterprise Solutions (Singapore) Pte. Ltd., New Tech Park (SG)

(72) Inventors: Paul Artman, Cary, NC (US); Andrew T. Junkins, Cary, NC (US); Jiabing Li, Cary, NC (US); Rodrigo Samper, Raleigh, NC (US); Marcelo Vinante, Wake Forest, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 212 days.

(21) Appl. No.: 14/859,252

(22) Filed: Sep. 19, 2015

(65) Prior Publication Data

US 2017/0083473 A1 Mar. 23, 2017

(51) Int. Cl.
*G06F 13/40* (2006.01)
*G06F 13/42* (2006.01)

(52) U.S. Cl.
CPC ...... *G06F 13/4068* (2013.01); *G06F 13/4081* (2013.01); *G06F 13/4282* (2013.01)

(58) Field of Classification Search
CPC ............ G06F 13/4068; G06F 13/4081; G06F 13/4282; G06F 13/385
See application file for complete search history.

(56) References Cited

U.S. PATENT DOCUMENTS

| | | | |
|---|---|---|---|
| 2014/0359189 A1* | 12/2014 | Kotzur | G06F 13/385 710/305 |
| 2016/0073544 A1* | 3/2016 | Heyd | G11B 33/128 361/679.31 |

* cited by examiner

*Primary Examiner* — Ernest Unelus
(74) *Attorney, Agent, or Firm* — Olive Law Group, PLLC

(57) ABSTRACT

Computing devices having slots and components for receipt of different types of peripherals are disclosed. According to an aspect, a computing device includes a body that defines an interior and comprises a rear wall defining a slot that extends into the interior. The slot is sized and shaped for receipt of two or more different types of peripherals. The computing device includes a motherboard that defines another slot being sized and shaped for receipt of the different types of peripherals. The other slot is substantially coplanar with the second slot. The computing device includes a connector operably interfaced with the motherboard and configured to interface with the different types of peripherals.

11 Claims, 7 Drawing Sheets

COMPUTING DEVICES HAVING SLOTS AND COMPONENTS FOR RECEIPT OF DIFFERENT TYPES OF PERIPHERALS

TECHNICAL FIELD

The presently disclosed subject matter relates to computing device connectors. More specifically, the presently disclosed subject matter relates to computing devices having slots and components for receipt of different types of peripherals.

BACKGROUND

Servers are computing devices that operate within a client-server architecture. Such computing devices serve the requests of other computing devices or programs, referred to as clients. Servers may share data, information, or hardware with their clients. Example servers include a database server, a file server, a mail server, a print server, a web server, a gaming server, and an application server. Oftentimes, multiple servers will be collected and operate together in a server farm or cluster.

Servers and most other computing devices include slots that provide the capability to add to the server by fitting an expansion card containing specialized hardware. Such hardware can provide some specialized capability, such as video acceleration, sound, or disk drive control. The expansion card is typically a printed circuit board that can be inserted into an electrical connector or expansion slot on a computer motherboard, backplane, or riser card to add functionality via an expansion bus.

There are various standardized types of server sizes. For example, a rack unit (also referred to as "U" or "RU") is a unit of measure that describes the height of electronic equipment designed to mount in a 19-inch rack or a 23-inch rack. The 19 inches or 23 inches dimension reflects the width of the equipment mounting-frame in the rack including the frame; the width of the equipment can be mounted inside the rack is less. Space for expansion cards on servers can be very limited, especially for 1U servers. Therefore, there is a need to accommodate particular expansion card needs while also considering the limited space available for expansion cards. In addition, there is a desire to provide options for connecting different types of expansion cards to a server.

SUMMARY

Disclosed herein computing devices having slots and components for receipt of different types of peripherals. According to an aspect, a computing device includes a body that defines an interior and comprises a rear wall defining a slot that extends into the interior. The slot is sized and shaped for receipt of two or more different types of peripherals. The computing device includes a motherboard that defines another slot being sized and shaped for receipt of the different types of peripherals. The other slot is substantially coplanar with the second slot. The computing device includes a connector operably interfaced with the motherboard and configured to interface with the different types of peripherals.

According to another aspect, a computing device includes a body that defines an interior and comprises a rear wall defining a first set of slots that extends into the interior. Each of the first set of slots being sized and shaped for receipt of two or more different types of peripherals. The computing device also includes a motherboard that defines a second set of second slots being sized and shaped for receipt of the different types of peripherals. Each of the first set of slots being substantially coplanar with a respective one of the second set of slots The computing device also includes multiple connectors operably interfaced with the motherboard and each connector being configured to interface with the different types of peripherals.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

As referred to herein, the term "computing device" should be broadly construed. For example, the computing device may be any type of conventional computer such as a server, a desktop computer, or a laptop computer. Although many of the examples provided herein are implemented on a server, the examples may similarly be implemented on any suitable computing device. As an example, a server is typically configured to run an instance of software that is capable of accepting requests from clients, and the computing device that executes such software. Clients may run on the same computer, but typically connect to the server through a network.

As referred to herein, the terms "motherboard" should be broadly construed. It is typically the main printed circuit board (PCB) found in computing devices, such as servers, desktop computers, and laptop computers. A motherboard can hold and allow communication between many of the crucial electronic components of a system, such as a CPU and memory, and provides connectors for other peripherals. A motherboard may include various sub-systems, such as one or more processors and other components. A PCB of a motherboard typically has expansion capability and can connect to one or more expansion components such as, but not limited to, sound cards, video cards, network cards, hard drives or other forms of persistent storages, cards providing extra USB or FireWire slots and a variety of other components.

Figure 1:
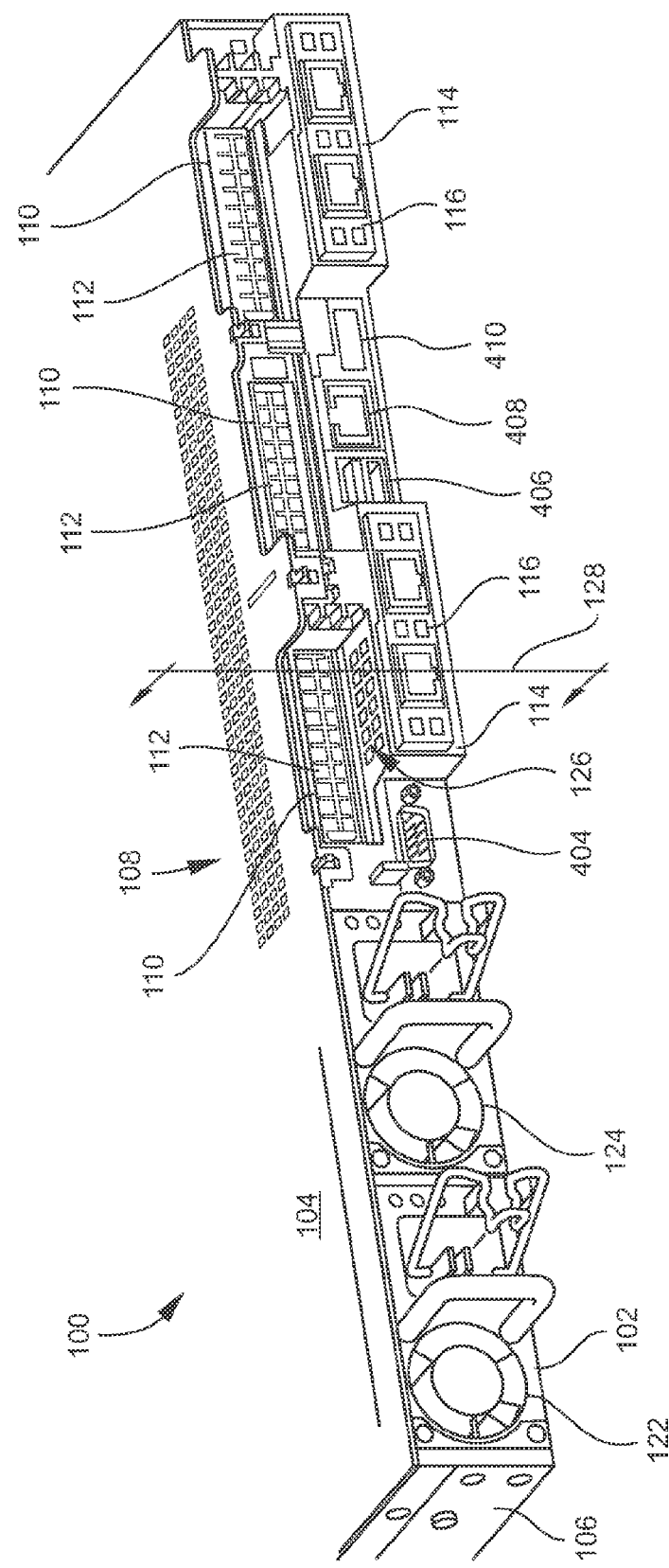
FIG. 1 is an isometric view of a rear portion of an example server in accordance with embodiments of the present disclosure.

In accordance with embodiments of the present disclosure, FIG. 1 illustrates an isometric view of a rear portion of an example server 100. It should be understood that although the example of FIG. 1 shows a server, the server may alternatively be any other suitable type of computing device configured to interface with peripherals. For example, the server may be a desktop computer having one or more I/O connectors for interfacing with peripherals.

Referring to FIG. 1, the server 100 includes a server rack chassis body including a rear wall 102, a top 104, and a side wall 106. The body also includes a side wall (not shown) that opposed the side wall 106, a bottom (not shown) that opposed the top 104, and a front (not shown) that opposed the rear wall 102 as will be understood by those of skill in the art. The components of the body may be formed using any suitable technique and suitable materials for housing electronic components. For example, the components may be formed of stamped sheet metal.

The top 104 may also define multiple openings 108 for allowing ventilation into an interior space of the server 100 where electronic components are positioned. Any of the other components of the body may also define openings for ventilation. Electronic components can also be cooled with fluid flowing from outside server 100. Such fluid flow may include forced convection cooling provided by transferring air between the body of the server 100 and the surrounding atmosphere by a fan and/or other source of fluid flow. It should be understood that ventilation holes may be of any suitable orientation, shape, and/or size.

The rear wall 102 may define multiple openings or holes configured for input/output connectors for electronic components connected to an information handling system, such as a motherboard. In an example, slots 110 may provide a suitable interface with internal electronic components in accordance with embodiments of the present disclosure. Slots 110 in this example are peripheral component interconnect express (PCIe) slots. Each slot 110 can alternatively be used for interfacing with any suitable internal component. For example, each slot 110 may allow a corresponding PCIe connector 112 to be exposed through the rear wall 102.

In another example, the rear wall 102 defines other slots 114 for providing a suitable interface with other internal electronic components in accordance with embodiments of the present disclosure. Slots 114 in this example are slots for other types of I/O cards. For example, each slot 114 may allow a corresponding PCIe adaptor card 116 (e.g., Ethernet network interface card, Fiber Channel host bus adapter, SAS host bus adapter) to be exposed through the rear wall 102.

In accordance with embodiments of the present disclosure, the rear wall 102 may be contoured such that the slot 114 extends from other components positioned along the rear wall 102 as shown in FIG. 1. This portion of the rear wall 102 may also define multiple openings 126 at a top portion. The openings 126 can provide ventilation for the slot 114.

Figure 2:
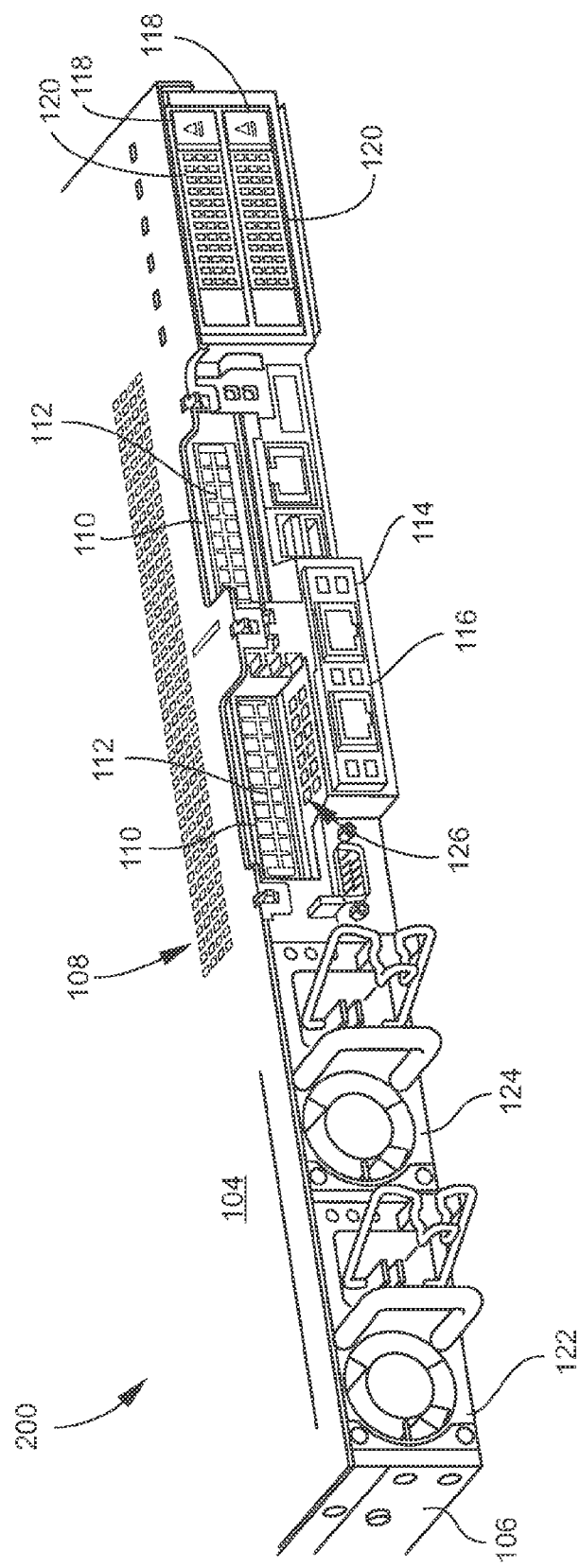
FIG. 2 is an isometric view of a rear portion of another example server in accordance with embodiments of the present disclosure.

FIG. 2 illustrates an isometric view of a rear portion of another example server 200. The server 200 includes a server rack chassis body including a rear wall 102, a top 104, and a side wall 106. The body also includes a side wall (not shown) that opposed the side wall 106, a bottom (not shown) that opposed the top 104, and a front (not shown) that opposed the rear wall 102 as will be understood by those of skill in the art. The components of the body may be formed using any suitable technique and suitable materials for housing electronic components. The top 104 may also define multiple openings 108 for allowing ventilation into an interior space of the server 100 where electronic components are positioned.

The rear wall 102 may define multiple openings or holes configured for input/output connectors for electronic components connected to an information handling system, such as a motherboard. In an example, slots 110 may be PCIe slots for allowing a corresponding PCIe connector 112 to be exposed through the rear wall 102.

In another example, the rear wall 102 defines another slot 114 for providing a suitable interface with another internal electronic component in accordance with embodiments of the present disclosure. Slot 114 in this example is a slot for another types of I/O card. For example, slot 114 may allow a corresponding PCIe adaptor card 116 (e.g., Ethernet network interface card, Fiber Channel host bus adapter, SAS host bus adapter) to be exposed through the rear wall 102.

In yet another example, the rear wall 102 defines other slots 118 for providing suitable interfaces with other internal electronic components in accordance with embodiments of the present disclosure. Slot 118 in this example is a slot for another type of I/O card. For example, slot 118 may allow a corresponding hard drive disk (HDD) module 120 to be exposed through the rear wall 102. In this example, the HDD modules 120 are 2.5 inch HDD modules but may alternatively be any other suitable size or type of HDD module.

Figure 3:
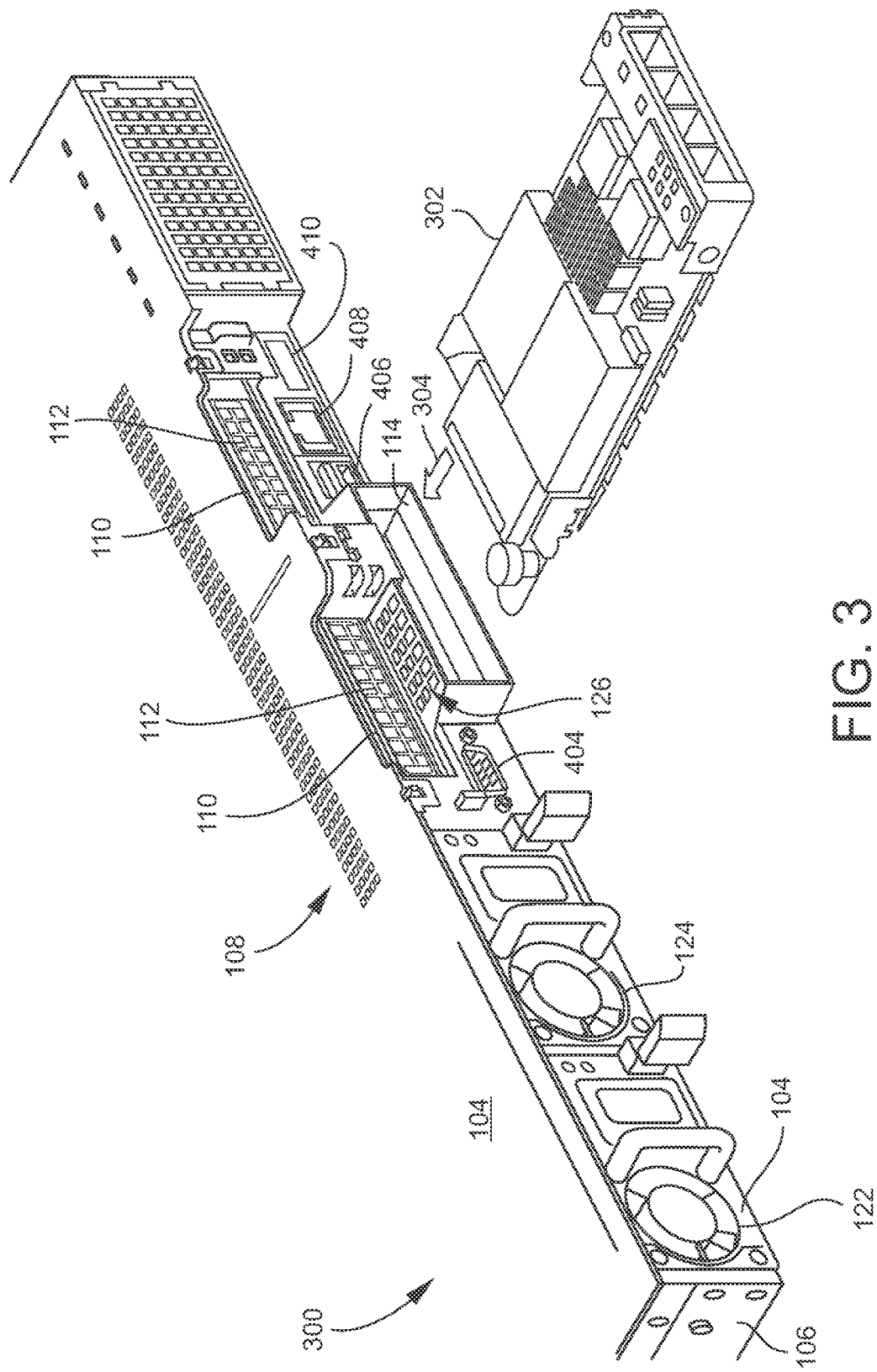
FIG. 3 is an isometric view of a rear portion of another example server in accordance with embodiments of the present disclosure.

FIG. 3 illustrates an isometric view of a rear portion of another example server 300. Server 300 is generally the same as server 200 shown in FIG. 2 except that the electronic component that is to fit in the slot 114 is a PCIe adapter card 302. In the figure, the PCIe adapter card 302 is positioned outside of the server 300, although it should be understood that the PCIe adapter card 302 can be moved generally in the direction of arrow 304 for interfacing with an internal electronic components of the server 300.

Server 300 also includes an HDD module 411 (a 2×2.5" form factor hard drive in this example). This replaces the upper standard PCIe slot and the lower custom form-factor PCIe adapter card.

Figure 4:
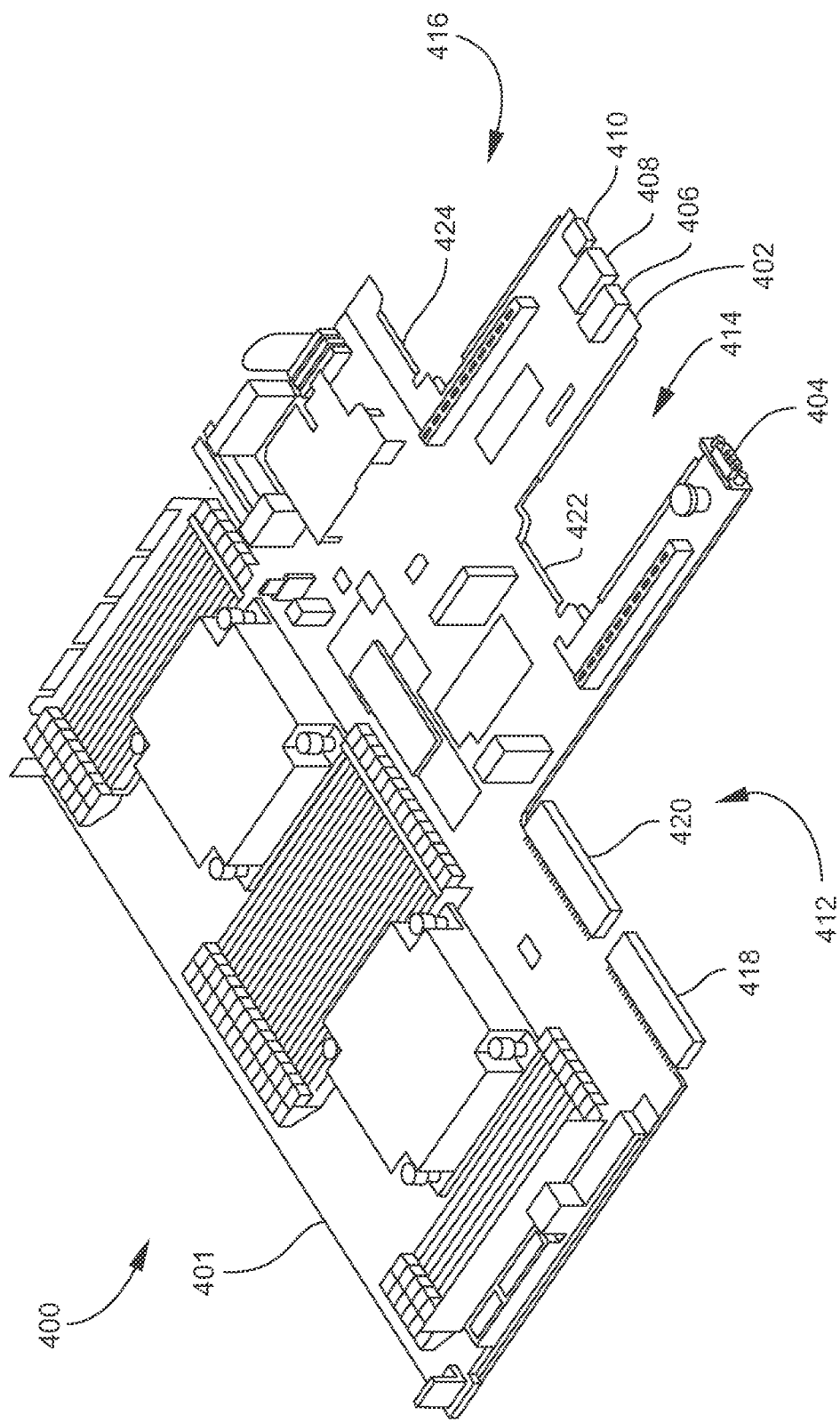
FIG. 4 is an isometric view of an example server motherboard in accordance with embodiments of the present disclosure.

FIG. 4 illustrates an isometric view of an example server motherboard 400 in accordance with embodiments of the present disclosure. The motherboard 400 may be utilized with the servers 100 and 200 shown in FIGS. 1 and 2, respectively. The motherboard 400 may include a PCB 401 and other electronic components, such as one or more CPUs and memory, as will be understood by those of skill in the art. Further, the motherboard 400 may provide connectors for peripherals.

The motherboard 400 may include mounting components for suitable attachment to the side walls, a bottom, top and a front of the servers. It is noted that in FIG. 4 the motherboard 400 is oriented in the same orientation as the servers 100 and 200 shown in FIGS. 1 and 2, respectively. In other words for example, a rear edge 402 of the motherboard 400 is configured to attach to an interior of the rear 102 of the server 100 shown in FIG. 1. Further, for example, I/O connectors 404, 406, 408, and 410 attached to the motherboard 400 correspond to the I/O connectors having the same reference numbers shown in FIG. 1. The rear 102 defines openings such that the I/O connectors 404, 406, 408, and 410 can fit there through once assembled as shown in FIG. 1 and as will be understood to those of skill in the art. In this example, I/O connector 404 is a serial connector, I/O connector 406 is a rear management connector, and I/O connector 408 is a video connector.

With continuing reference to FIG. 4, the PCB 401 defines multiple slots 412, 414, and 416 at its rear edge 402 for receiving peripherals. Slot 412 may include connectors 418 and 420 for connecting to a set of fans. For example, connectors 418 and 420 may be configured to suitably connect to fans 122 and 1240, respectively, that are shown in the example of FIG. 1.

In accordance with embodiments of the present disclosure, slots 414 and 416 are each sized and shaped for connecting to peripherals, such as a custom form-factor PCIe adapter card (e.g., Ethernet network interface card, Fiber Channel host bus adapter, or SAS host bus adapter) 116 shown in FIG. 1. As an example, slot 416 can be sized and shaped specifically to allow nesting of a 2×2.5" HDD module. Nesting can be utilized to allow two 2.5" hot-swap HDD trays to be stacked in a 1U system. Connectors 422 and 424 can be positioned on edges of the PCB 401 such that a corresponding connector of a peripheral (e.g., expansion card) may be accepted when situated in the slot for interfacing with the peripheral.

Slots 416 and 418 are sized in this example to also allow the HDD bay module to reside in this same space. Connectors 424 and 422 can provide the connection to the between the custom form-factor PCIe adapter cards and the PCIe bus on the motherboard.

Figure 5:
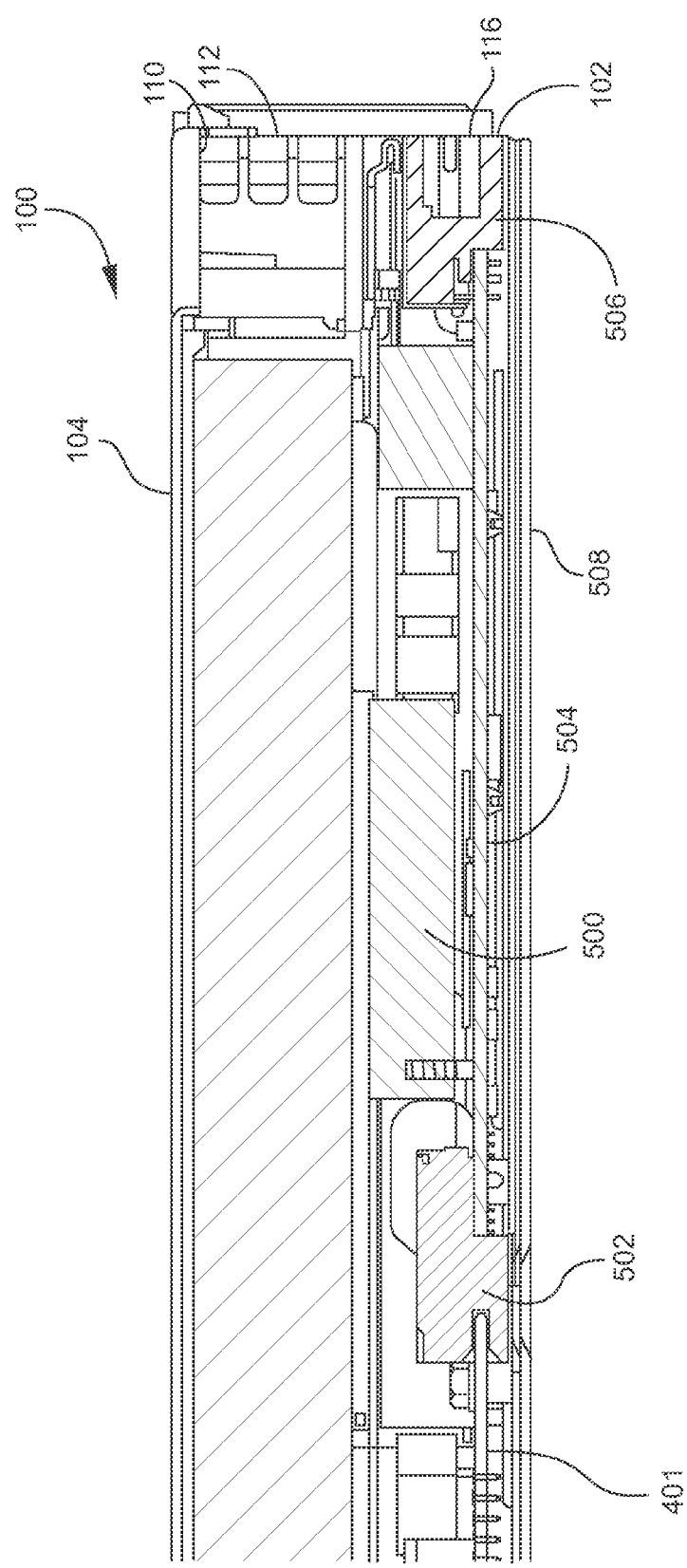
FIG. 5 is a cross-sectional side view of the rear portion of the example server shown in FIG. 1.

FIG. 5 illustrates a cross-sectional side view of the rear portion of the example server shown in FIG. 1. This figure provides additional details. The cross-sectional side view is cut across along indicator 128 shown in FIG. 1. Referring to FIG. 5, a heat sink 500, connector 502, PCB 504, and I/O ports 506 of peripheral 116 are shown. The peripheral 116 is shown as being coplanar with the PCB 401. A bottom side 508 of the body is also shown.

Figure 6:
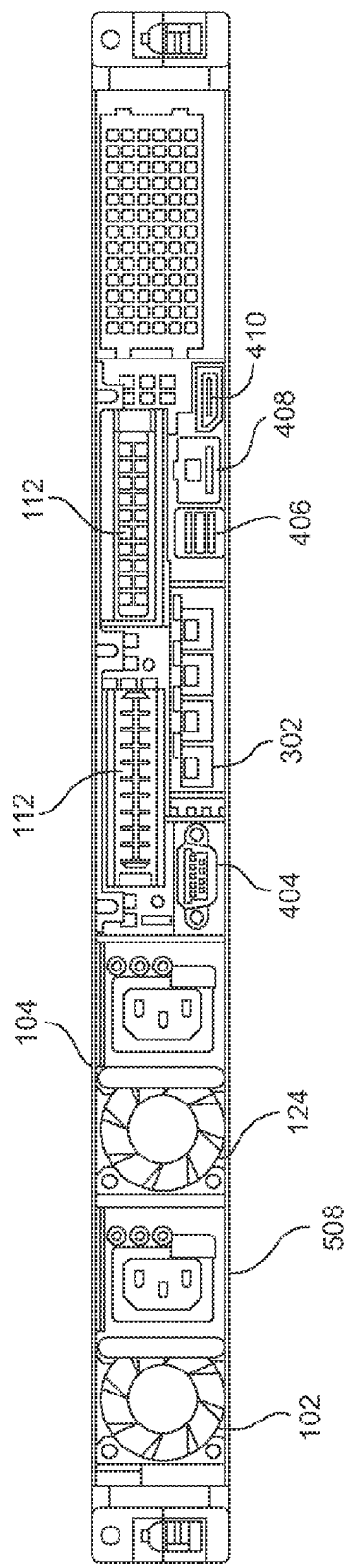
FIG. 6 is a rear view of the example server shown in FIG. 3.

FIG. 6 illustrates a rear view of the example server shown in FIG. 3.

Figure 7:
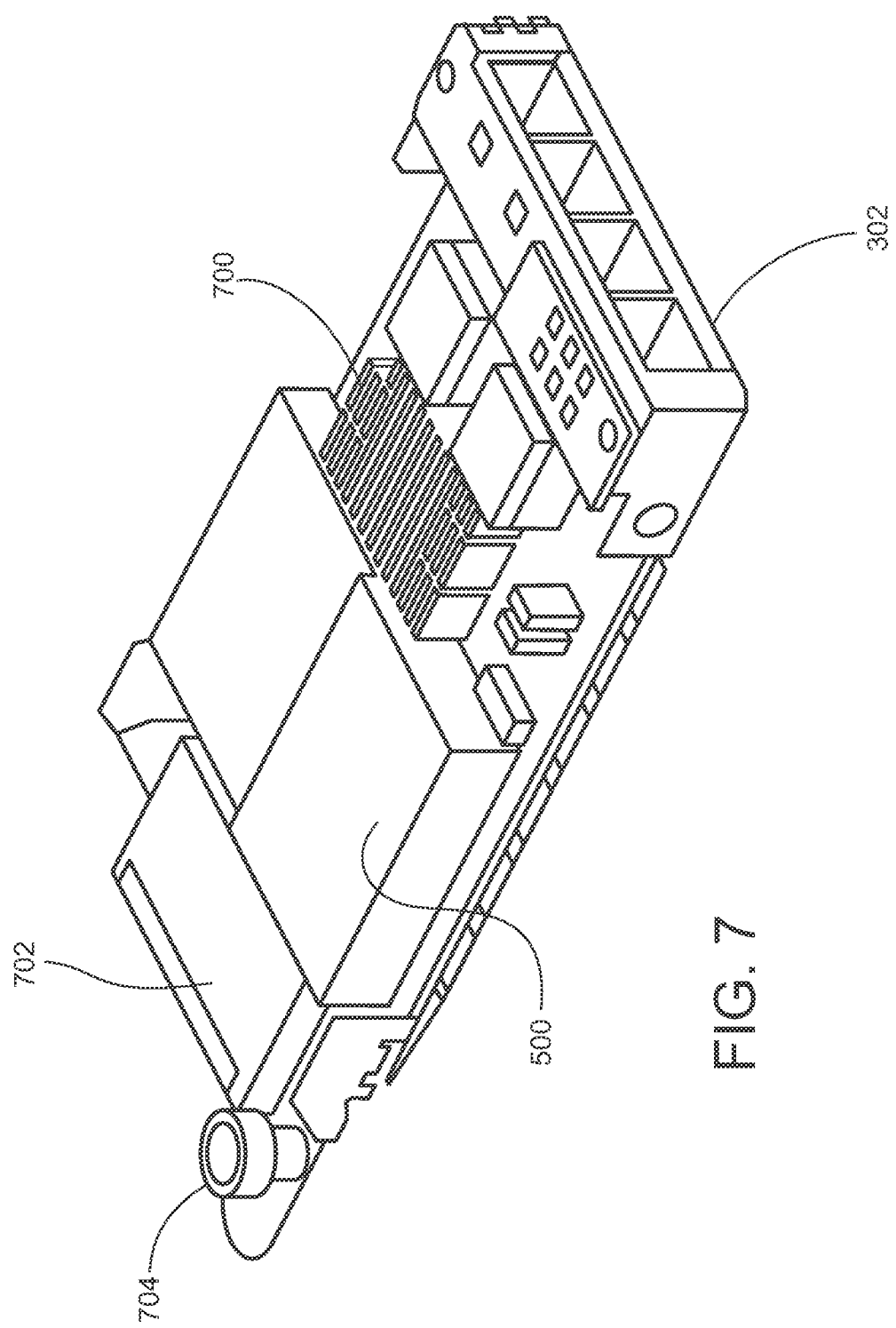
FIG. 7 is an isometric view of an example peripheral for use with a server in accordance with the embodiments disclosed herein.

FIG. 7 illustrates an isometric view of an example peripheral 116 for use with a server in accordance with the embodiments disclosed herein. Referring to FIG. 7, the peripheral 116 includes heat sink 500, a PCB assembly 700, and a connector 702 for connecting to a motherboard. The peripheral 116 also includes a thumbscrew 704 for holding the peripheral to the motherboard.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a body with a top wall, a side wall, and an interior, wherein the interior comprises a rear wall with a first slot that extends within a first horizontal plane and into the interior and enables a connection with a plurality of peripherals of a first protocol,
wherein the rear wall comprises a plurality of openings that extend within a first vertical plane;
a motherboard comprising a second slot, a third slot, and a rear edge, wherein the second and the third slots are of a same size that extends out of the interior at a second protocol,
wherein the motherboard is housed within the interior of the body and the rear edge of the motherboard is oriented such that the second slot, and the third slot is aligned co-planarly with the first slot; and
a connector, operatively interfaced with the motherboard and positioned at the rear edge of the motherboard, that provides a direct connection to a second plurality of peripherals of the second protocol.

2. The computing device of claim 1, wherein the plurality of peripherals comprise at least one of an expansion card, an adapter card, a network interface device, a custom form-factor PCIe adapter card, and a small form-factor SFF-8201 hard drive disk module.

3. The computing device of claim 1, wherein the plurality of openings comprises an opening for providing ventilation.

4. The computing device of claim 1, wherein the second slot of the motherboard allows nesting of the plurality of peripherals.

5. The computing device of claim 1, wherein the body comprises a server rack chassis.

6. The computing device of claim 1, wherein the second slot is based on a predetermined orientation comprising a dimension of at least one of the plurality of peripherals.

7. A method comprising:
placing a motherboard within an interior of a body of a computing device, wherein the body comprises a top wall, a side wall, and the motherboard comprising a first slot, second slot, a third slot, and rear edge, wherein the second and the third slots are of a same size that extends out of the interior at a second protocol,
wherein the interior comprises a rear wall with the first slot extending within a first horizontal plane and into the interior and enables a connection with a plurality of peripherals of a first protocol;
enabling a connection with a plurality of peripherals at a co-planar alignment of the first slot with a second slot and a rear edge of the motherboard situated in the interior of the body that extends into the rear wall of the interior of the body to receive a peripheral aligned co-planarly,
wherein the rear wall comprises a plurality of openings that extend within a first vertical plane;
and
interfacing, by a connector positioned at a rear edge of the motherboard, a second plurality of peripherals at a second protocol.

8. The method of claim 7, wherein the second slot of the motherboard is based on a predetermined orientation comprising a dimension of the peripheral.

9. The method of claim 7, wherein the body comprises a server rack chassis.

10. The method of claim 7, wherein the peripheral comprises at least one of an expansion card, an adapter card, a network interface device, a custom form-factor PCIe adapter card, and a small form-factor SFF-8201 hard drive disk module.

11. The method of claim 7, wherein the plurality of openings comprises an opening for providing ventilation.

* * * * *